United States Patent
Baumann

(10) Patent No.: US 9,033,328 B2
(45) Date of Patent: May 19, 2015

(54) RECONFIGURABLE CLAMPING SYSTEM

(75) Inventor: John A. Baumann, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 632 days.

(21) Appl. No.: 10/698,215

(22) Filed: Oct. 31, 2003

(65) Prior Publication Data

US 2005/0093219 A1    May 5, 2005

(51) Int. Cl.
   *B25B 5/14*     (2006.01)
   *B25B 5/06*     (2006.01)
   *B23K 37/04*    (2006.01)
   *B23K 20/12*    (2006.01)
   *B25B 5/00*     (2006.01)

(52) U.S. Cl.
   CPC ............... *B23K 37/04* (2013.01); *B23K 20/126* (2013.01); *B25B 5/003* (2013.01); *B25B 5/061* (2013.01); *B25B 5/14* (2013.01)

(58) Field of Classification Search
   USPC .......................... 269/266, 37, 45, 75, 43, 296
   See application file for complete search history.

(56) References Cited

U.S. PATENT DOCUMENTS

| | | | | |
|---|---|---|---|---|
| 546,421 | A | * | 9/1895 | Duke ................................ 269/9 |
| 2,052,380 | A | | 8/1936 | Chapman |
| 2,324,803 | A | * | 7/1943 | Snyder ............................ 269/75 |
| 2,391,426 | A | | 12/1945 | Kramer et al. |
| 2,968,054 | A | * | 1/1961 | Haumann et al. ............. 269/104 |
| 3,024,521 | A | * | 3/1962 | Polk .......................... 29/890.054 |
| 3,110,277 | A | | 11/1963 | Dixon et al. |
| 3,376,184 | A | | 4/1968 | Ritchey et al. |
| 3,423,082 | A | * | 1/1969 | Reyner .......................... 269/266 |
| 3,616,075 | A | | 10/1971 | Jarvis et al. |
| 3,712,529 | A | | 1/1973 | Ozawa et al. |
| 4,253,649 | A | * | 3/1981 | Hewson .......................... 269/45 |
| 4,356,615 | A | * | 11/1982 | Dearman ........................ 29/525 |
| 4,492,015 | A | | 1/1985 | Dearman |
| 4,527,783 | A | * | 7/1985 | Collora et al. .................. 269/21 |
| 4,582,241 | A | | 4/1986 | Johnson |
| 4,595,444 | A | | 6/1986 | Legge et al. |
| 4,606,522 | A | * | 8/1986 | Heifetz ....................... 248/276.1 |
| 4,647,980 | A | | 3/1987 | Steventon et al. |
| 4,684,113 | A | * | 8/1987 | Douglas et al. ............... 269/266 |
| 4,726,575 | A | * | 2/1988 | Dearman ........................ 269/43 |
| 4,813,657 | A | | 3/1989 | Todd |
| 4,948,491 | A | | 8/1990 | Kato et al. |

(Continued)

FOREIGN PATENT DOCUMENTS

| | | |
|---|---|---|
| DE | 3734127 A1 | 4/1989 |
| EP | 1541274 A1 | 6/2005 |

(Continued)

*Primary Examiner* — Hadi Shakeri

(57) ABSTRACT

The present invention is directed to apparatus and methods for clamping along a work piece. In one embodiment, a clamping system includes one or more force applying units each including a plunger or force applying member adapted to apply clamping force to the work piece, and one or more coupling units linked with the force applying units forming a chain of force applying units and coupling units. The coupling units may include a lockable pivot adapted to pivot to conform the chain to the surface of the work piece when unlocked, and adapted to be locked when at least one of the plurality of force applying units applies clamping force to the work piece. In another embodiment, a clamping system may include multi-axis pivot units. In a further embodiment, a clamping system may include length adjusting units.

4 Claims, 9 Drawing Sheets

(56) References Cited

U.S. PATENT DOCUMENTS

| | | | |
|---|---|---|---|
| 4,964,606 A | 10/1990 | Beam et al. | |
| D320,028 S | 9/1991 | Sedighzadeh et al. | |
| 5,145,128 A | 9/1992 | Umeda | |
| 5,148,282 A | 9/1992 | Sedighzadeh | |
| 5,172,846 A | 12/1992 | Hayashi et al. | |
| D332,714 S | 1/1993 | Sedighzadeh et al. | |
| D332,715 S | 1/1993 | Sedighzadeh et al. | |
| 5,181,771 A | 1/1993 | Robak et al. | |
| D333,061 S | 2/1993 | Sedighzadeh | |
| D333,398 S | 2/1993 | Sedighzadeh et al. | |
| D333,582 S | 3/1993 | Sedighzadeh et al. | |
| D334,763 S | 4/1993 | Sedighzadeh et al. | |
| 5,236,213 A * | 8/1993 | Trickett | 280/304.1 |
| D341,135 S | 11/1993 | Sedighzadeh et al. | |
| 5,263,632 A | 11/1993 | Zadrick et al. | |
| 5,280,892 A * | 1/1994 | Smith | 269/75 |
| 5,501,042 A | 3/1996 | Gustaveson et al. | |
| 5,535,938 A | 7/1996 | Leduc | |
| 5,583,735 A | 12/1996 | Pease et al. | |
| 5,590,604 A | 1/1997 | Lund | |
| 5,612,741 A | 3/1997 | Loban et al. | |
| 5,643,522 A | 7/1997 | Park | |
| 5,657,972 A | 8/1997 | Blatt | |
| D390,219 S | 2/1998 | Rosen | |
| 5,743,487 A | 4/1998 | Rice | |
| D394,432 S | 5/1998 | Rosen | |
| D399,200 S | 10/1998 | Rosen | |
| D399,503 S | 10/1998 | Rosen | |
| 5,847,685 A | 12/1998 | Otsuki | |
| D409,597 S | 5/1999 | Rosen | |
| D410,458 S | 6/1999 | Rosen | |
| 5,954,842 A | 9/1999 | Fogal et al. | |
| 6,092,705 A | 7/2000 | Meritt | |
| 6,127,646 A | 10/2000 | Aebersold et al. | |
| 6,189,764 B1 | 2/2001 | Hannan | |
| 6,237,832 B1 | 5/2001 | Chung | |
| 6,264,088 B1 | 7/2001 | Larsson | |
| 6,371,353 B1 | 4/2002 | Ikeda et al. | |
| 6,424,386 B1 | 7/2002 | Shimizu | |
| 6,551,428 B1 | 4/2003 | Guillou et al. | |
| 6,554,175 B1 | 4/2003 | Thompson | |
| 6,666,371 B2 | 12/2003 | Nakazawa et al. | |
| 6,722,556 B2 | 4/2004 | Schilling et al. | |
| 6,769,595 B2 | 8/2004 | Stol et al. | |
| 6,986,452 B2 | 1/2006 | Dracup et al. | |
| 7,048,174 B2 | 5/2006 | Buchheit et al. | |
| 7,210,610 B2 | 5/2007 | Nelson et al. | |
| 7,216,793 B2 | 5/2007 | Stotler et al. | |
| 7,322,981 B2 * | 1/2008 | Jackson | 606/266 |
| 2002/0179682 A1 | 12/2002 | Schilling et al. | |
| 2003/0209586 A1 | 11/2003 | Thompson | |
| 2005/0001010 A1 | 1/2005 | Koga et al. | |
| 2005/0092817 A1 | 5/2005 | Baumann et al. | |
| 2005/0093219 A1 | 5/2005 | Baumann | |
| 2006/0102689 A1 | 5/2006 | Trapp et al. | |
| 2006/0102699 A1 | 5/2006 | Burton et al. | |
| 2006/0169741 A1 | 8/2006 | Smith et al. | |
| 2006/0191978 A1 | 8/2006 | Barnes | |

FOREIGN PATENT DOCUMENTS

| | | |
|---|---|---|
| FR | 2576371 | 7/1985 |
| GB | 1332523 | 1/1971 |
| GB | 2169836 A | 7/1986 |
| JP | 2002120076 | 4/2002 |
| JP | 2003154472 | 5/2003 |
| JP | 2003205374 | 7/2003 |
| WO | WO2004018141 A1 | 3/2004 |
| WO | WO2005042208 A2 | 5/2005 |

* cited by examiner

RECONFIGURABLE CLAMPING SYSTEM

FIELD OF THE INVENTION

This invention relates generally to clamping and, more specifically, to clamping during manufacturing operations.

BACKGROUND OF THE INVENTION

During manufacturing work such as machining, routing, cutting, and welding, the work piece is often held by clamps when a manufacturing tool engages it. Such clamps include bar clamps, C-clamps, vises, and other clamping tools. In manufacturing operations where a tool engages the work piece with some force, clamping at fixed or distanced locations may not be sufficient to hold the work piece in position. There may be a distance between the manufacturing tool and the implied clamp or clamps. Further, clamping may not be engaged in those areas near the tool as it engages the work piece.

In friction stir welding, a process that plastically bonds metals, plunging the friction stir welding tool into a weld line of a work piece and moving the tool along the weld line can push the parts of the work piece being welded away from the underlying structure, or away from each other. Accordingly, there is an unmet need for clamping systems that can engage a work piece along a working area for a manufacturing tool.

SUMMARY OF THE INVENTION

The present invention is directed to an apparatus and methods for clamping along a work piece. In one embodiment, a clamping system includes a plurality of force applying units each including a plunger to apply clamping force to the work piece. A plurality of coupling units are linked with the force applying units forming a chain of force applying units and coupling units. In another aspect of the invention, the coupling units include a lockable pivot adapted to pivot to conform the chain to the surface of the work piece when unlocked, and adapted to be locked when at least one of the plurality of force applying units applies clamping force to the work piece. In accordance with other aspects of the invention, the clamping system includes multi-axis pivot units coupled in a chain with the force applying units. In another embodiment, the system includes length adjusting units.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to an apparatus and methods for clamping. Many specific details of certain embodiments of the invention are set forth in the following description and in FIGS. 1-9 to provide a thorough understanding of such embodiments. One skilled in the art, however, will understand that the present invention may have additional embodiments, or that the present invention may be practiced without several of the details described in the following description.

Figure 1:
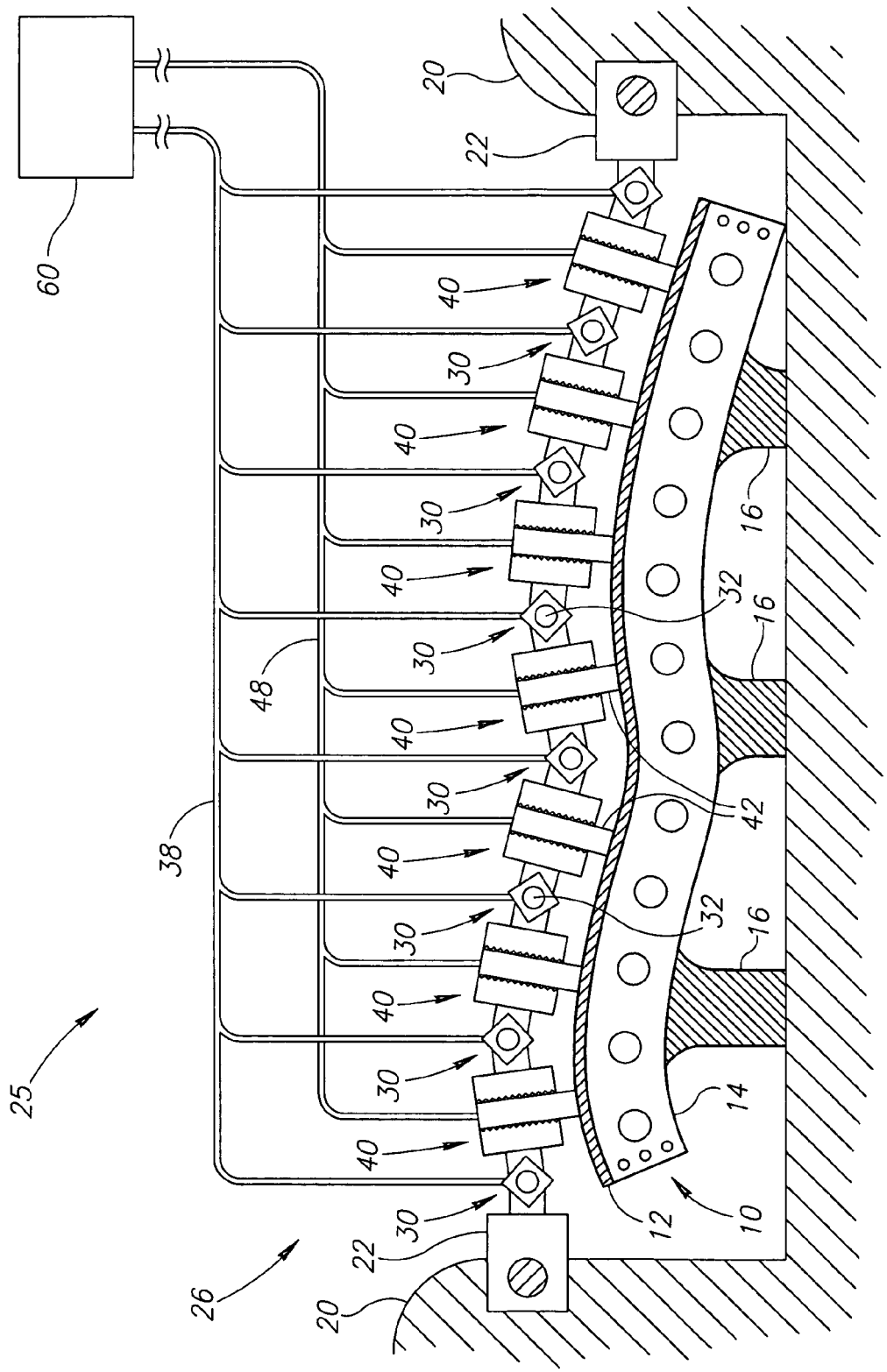
FIG. 1 is a side view of an exemplary clamp system engaged with a workpiece in accordance with an embodiment of the present invention.

FIG. 1 shows an exemplary clamping system 25 in position over a work piece 10 in accordance with an embodiment of the present invention. The work piece 10 includes a frame 14 with a skin 12 being fastened to the frame. The frame is held on a crib 16 that supports the work piece 10 during the manufacturing process such as machining, routing, cutting, or welding. It will be appreciated that multiple clamping systems 25 of the present invention may be utilized simultaneously on a work piece 10.

In this exemplary embodiment, the clamping system 25 includes a chain 26 of force applying units 40 and coupling units 30. The chain 26 is attached through end supports 22 to secure anchors 20. The anchors 20 hold the chain 26 in place when the force applying units 40 apply a clamping force to the work piece 10. In this example embodiment, the force applying units 40 hold the skin 12 against the frame 14 of the work piece 10 during the manufacturing operation (not shown). The chain 26 of force applying units 40 and coupling units 30 spans the work piece 10. The chain 26 is anchored at its ends by the end supports 22 attached to anchors 20. In this example embodiment, the chain 26 of the clamping system 25 includes eight coupling units 30, and seven force applying units 30 in a sequence as follows: end support 22/coupling unit 30/force applying unit 40/coupling unit 30/force applying unit 40/coupling unit 30/force applying unit 40/coupling unit 30/force applying unit 40/coupling unit 30/force applying unit 40/coupling unit 30/force applying unit 40/coupling unit 30/force applying unit 40/coupling unit 30/end support 22.

By way of example and not limitation, the coupling units 30 include lockable pivots 32 permitting the chain 26 of coupling units 30 and force applying units 40 to be flexible and drape over the work piece 10 when the coupling units 30 are unlocked, but to form a rigid chain 26 when the coupling units 30 are locked. The force applying units 40 include plungers 42 that apply clamping force to the work piece 10 when activated. While the coupling units 30 and the force applying units 40 in this exemplary chain 26 alternate between force applying units 40 and coupling units 30, it will be appreciated that coupling units 30 may be attached directly to each other in sequence, as may force applying units 40. By way of example, a chain 26 may be assembled in a sequence such as: coupling unit 30/coupling unit 30/force applying unit 40/force applying unit 40/coupling unit 30/coupling unit 30/force applying unit 40/coupling unit 30, etc.

It will be appreciated that the coupling units 30 and the force applying units 40 may be hand operated, or may be automated or externally powered. By way of example and not limitation, the coupling units 30 may lock with a hand twist or a bolt and nut, or may lock through a mechanism such as a solenoid. The force applying units 40 may include threaded plungers similar to the moving part of a C-clamp, or may be externally powered, such as electrically through solenoids, or hydraulically or pneumatically through pistons. In the example embodiment shown in FIG. 1, the force applying units 40 and the coupling units 30 are electrically powered. Power to each of the coupling units 30 and the force applying units 40 is provided through a wiring harness 38 linked to a controller 60. The controller 60 suitably causes the coupling units 30 to lock and unlock and the force applying units 40 to apply clamping force or be relaxed.

It will be appreciated that in operation the chain 26 of the clamping system 25 of the present invention suitably may be draped over the work piece 10 with the coupling units 30 unlocked, allowing the chain 26 to at least partially conform to the surface contours of the work piece 10. The coupling units 30 may then be locked, and the force applying units 40 engaged with their plungers 40 to apply a clamping force to the work piece 10. Manufacturing may then proceed, in this example with the skin 12 held firmly in place against the frame 14 of the work piece 10 during manufacturing.

Figure 2A:
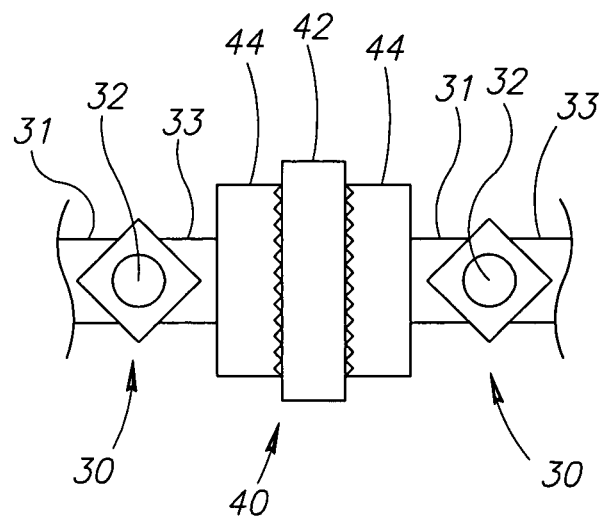
FIG. 2A is a side view of an exemplary force applying unit in accordance with an embodiment of the present invention in a relaxed configuration.

FIG. 2A is an enlarged side view of an exemplary force applying unit 40 attached between two coupling units 30 of the clamping system 25 of FIG. 1 in accordance with an embodiment of the present invention. The balance of the chain of coupling units 30 and force applying units 40 is not shown in FIG. 2A. The force applying unit 40 includes a body 44 to which the plunger 42 is movably linked. In FIG. 2A, the plunger 42 is shown in a withdrawn or relaxed position with the plunger 42 withdrawn at least partially up into the body 44. In this configuration, the plunger 42 would not be applying clamping force to a work piece (not shown).

Coupling units 30 are attached to the force applying unit 40 on each side of the force applying unit 40. The coupling units 30 include a lockable pivot 32 situated between a first arm and a second arm 33. The lockable pivot 32 permits the first arm 31 to bend with respect to the second arm 33 like an elbow, and then be locked into position. The arms 31 and 33 of the coupling unit 30 are attached to this example embodiment to the body 44 of the coupling unit 40, forming a chain of coupling units 30 and force applying units 40, such as that shown in FIG. 1. It will be appreciated that during manufacture and configuration of the clamping system 25 that the two arms 31 and 33 of the coupling unit 30 may be detachable from the adjoining force applying units 40, or part or all of the coupling unit 30 suitably may be unitized into force activating units 40, or vice versa.

Figure 2B:
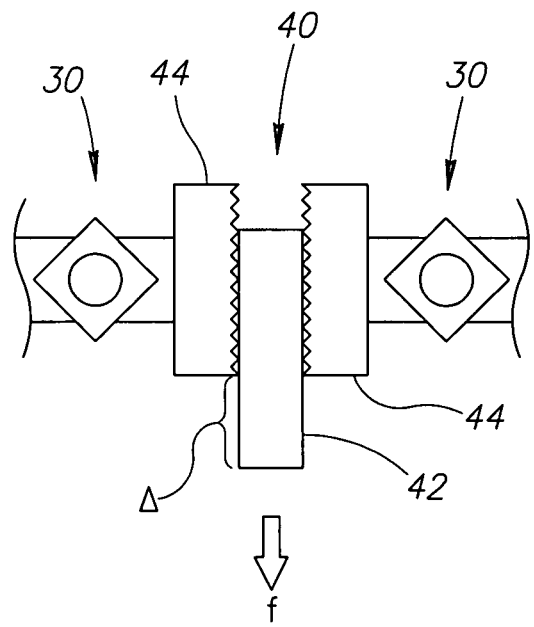
FIG. 2B is a side view of the exemplary force applying unit of FIG. 2A in a clamping configuration.

In FIG. 2B, the force applying unit 40 of FIG. 2A is shown in a clamping position. In this position, the plunger 42 of the force applying unit 40 is advanced by a distance A away from the body 44, thus applying a clamping force f to a work piece (not shown). The force applying unit 40 is held in place in the chain by its adjoining coupling units 30 and the balance of the chain which is attached to fixed supports (FIG. 1). While in many applications it is advantageous that the coupling units 30 be lockable, it will be appreciated that, as described more fully below with reference to FIG. 8, the coupling units 30 may suitably not be locked or lockable.

Figure 3A:
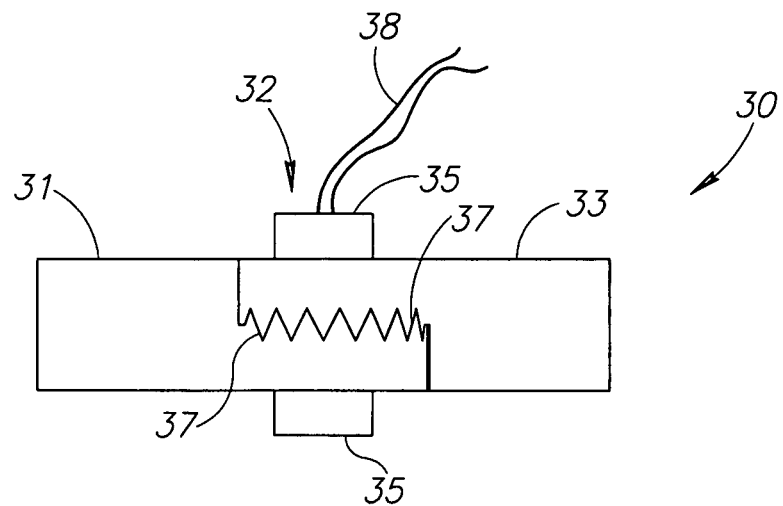
FIG. 3A is a top view of an exemplary coupling unit in accordance with an embodiment of the present invention.

Turning to FIG. 3A, a top view of an exemplary locking coupling unit 30 that can bend like an elbow is shown. The coupling unit 30 is an exemplary coupling unit 30 such as that shown in FIGS. 1, 2A and 2B for use in chains including force applying units. In this embodiment, the coupling unit 30 includes a first arm 31 and a second arm 33 linked by a pivot 32. The pivot 32 permits the first arm 31 and the second arm 33 to bend with respect to each other like an elbow with the pivot 32 forming the joint of the elbow. In this embodiment, the first arm 31 and the second arm 33 include interlocking teeth 37 that when clamped together lock the coupling unit 30 at a desired angle between the first arm 31 and the second arm 33 at the pivot 32. In this example, the pivot 32 further includes a locking solenoid 35 that when engaged through a wiring harness 38 holds the interlocking teeth 37 of the first arm 31 and the second arm 33 together, locking the pivot 32. When the locking solenoid 35 is not engaged, the interlocking teeth 37 of the first arm 31 and the second arm 33 may move apart (not shown) and the coupling unit 30 is free to pivot around its pivot point 32. It will be appreciated that electrical, hydraulic, pneumatic or other means suitably may be used to lock the pivot 32 when powered locking of the pivot is desired.

Figure 3B:
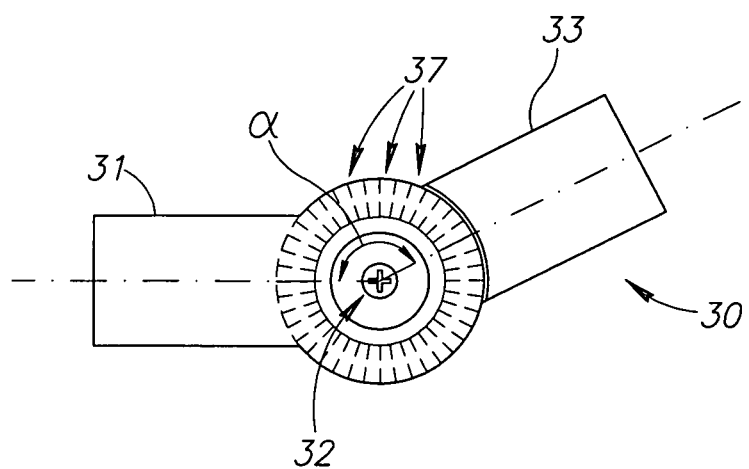
FIG. 3B is a side view of the exemplary coupling unit of FIG. 3A.

FIG. 3B is a side view of the coupling unit 30 as described with reference to FIG. 3A above. In this side view, the interlocking teeth 37 of the first arm 31 and the second arm 33 suitably radially surround the pivot 32 at the junction between the first arm 31 and the second arm 33. Thus, when the interlocking teeth 37 are engaged, an angle α between the first arm 31 and the second arm 33 is fixed, and when the interlocking teeth 37 are not engaged, the first arm 31 and the second arm 33 may pivot around the pivot 32 and the angle α between the first arm 31 and the second arm 33 may change. This allows a chain 26 of force applying units 40 and coupling units 30 of the present invention to conform to the surface of a work piece prior to the coupling units 30 being locked and the force applying units 40 engaged.

Figure 4:
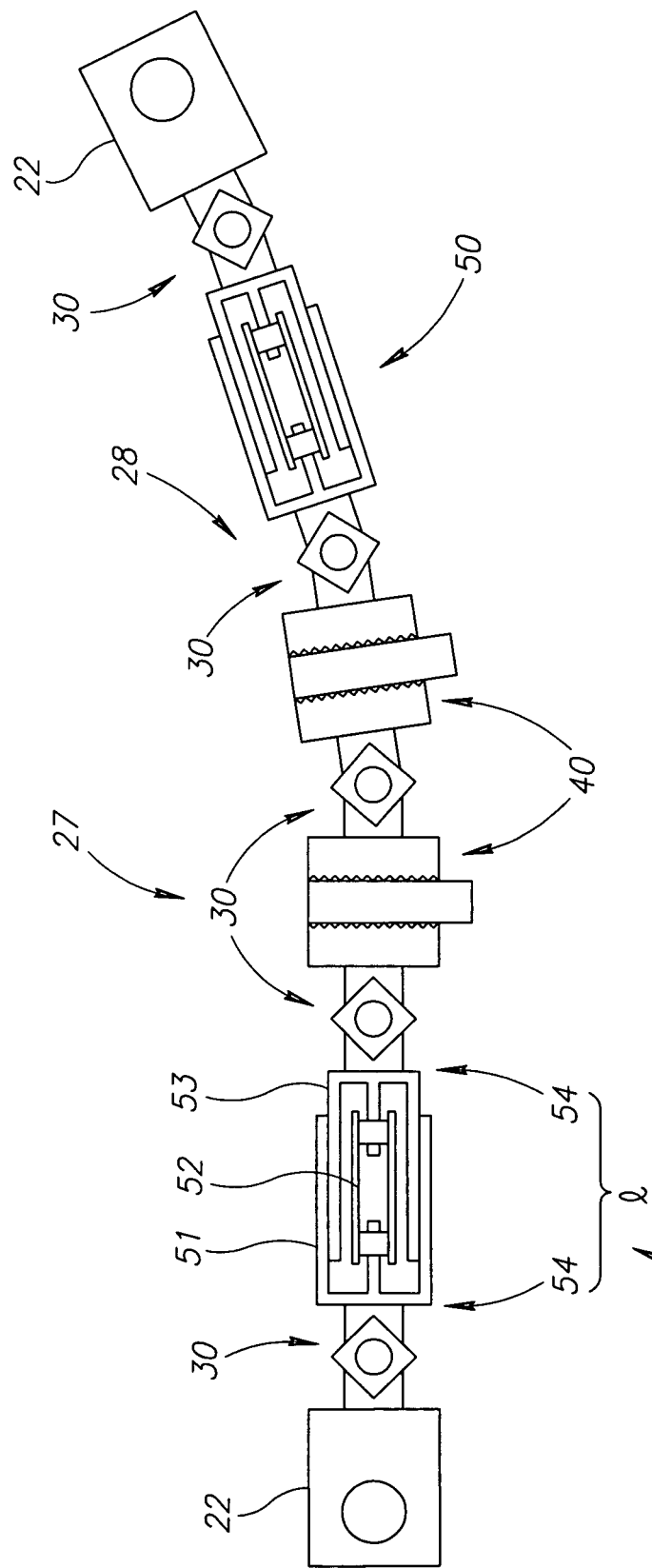
FIG. 4 is a side view of an exemplary clamping system with length adjusting units in accordance with another embodiment of the present invention.

In FIG. 4, an alternate embodiment of a clamping system 27 with length adjusting units 50 is shown in side view. The clamping system 27 forms a chain 28 that includes length adjusting units 50, coupling units 30, and force applying units 40. The coupling units 30 and the force applying units 40 are as described above in reference to FIGS. 1 through 3 above. The chain 28 of the clamping system 27 in this example embodiment includes the following sequence of units: end unit 22/coupling unit 30/length adjusting unit 50/coupling unit 30/force applying unit 40/coupling unit 30/force applying unit 40/coupling unit 30/length adjusting unit 50/coupling unit 30/end unit 22. The end units 22 suitably fasten a chain 28 to secure anchors (as shown in FIG. 1).

The length adjusting units 50 suitably allow the chain 28 to be adjusted in length, and allow distances between units in the chain to be adjusted, as appropriate for a particular clamping application. In this example, the length adjusting units 50 include a first sleeve 51 sliding within a second sleeve 53. The second sleeve 53 can be extended from or retracted within the first sleeve 51 to vary the length l between the two ends 54 of the length adjusting unit 50. Varying the length l between the ends 54 of the length adjusting unit 50 suitably allows the length of the chain 28 to be changed.

By way of example, but not limitation, the position of the second sleeve 53 within the first sleeve 51 is adjustably controlled by a turnbuckle 52. The turnbuckle 52 adjustably links the first sleeve 51 and the second sleeve 53. The turnbuckle 52 is suitably enclosed within the first sleeve 51 and the second sleeve 53 forming a compact length adjusting unit 50. It will be appreciated that the turnbuckle 52 may be manually operated or may be externally powered to change the length l of the length adjusting unit.

Figure 5A:
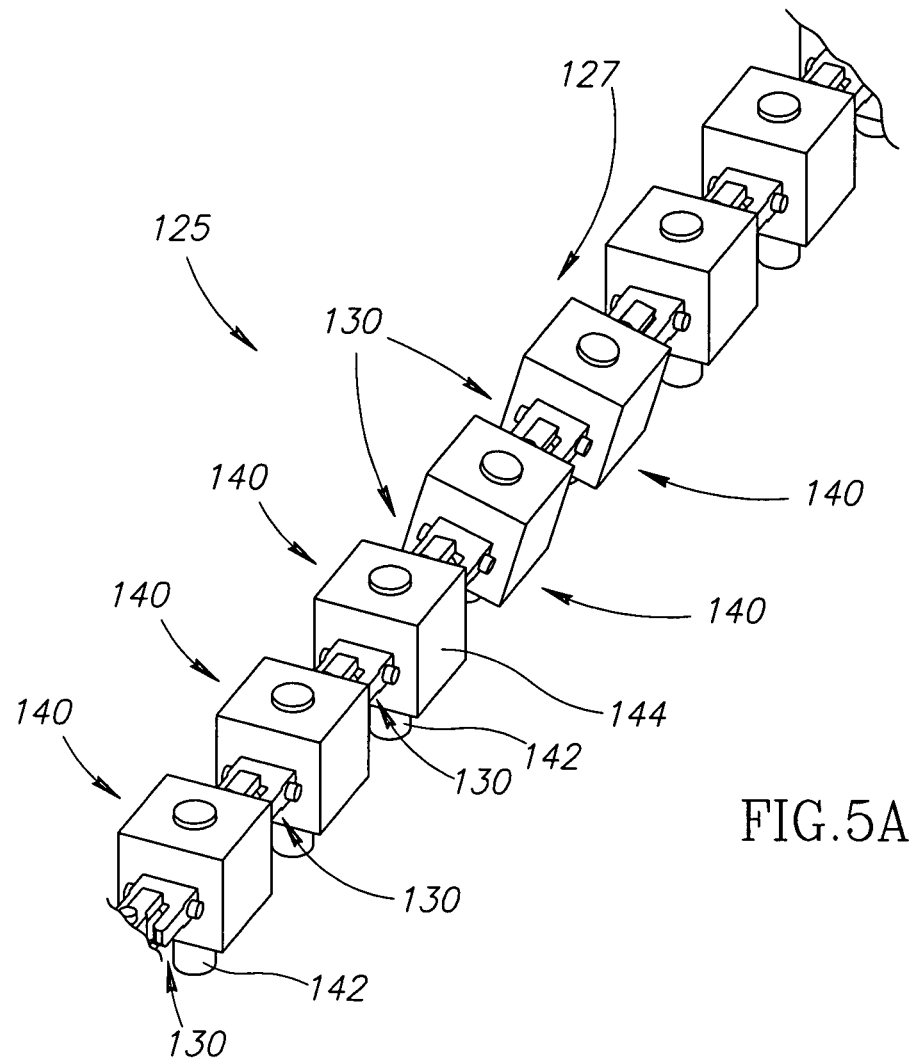
FIG. 5A is an isometric view of an exemplary multi-axis clamping system in accordance with yet another embodiment of the present invention.

The clamping system of the present invention suitably may be utilized to clamp complex shaped surfaces. For example, as shown in FIG. 5A, an exemplary clamping system 125 in accordance with another embodiment of the invention includes multi-axis couplers 130 that permit pivoting and rotation along multiple axes. FIG. 5A shows a chain 127 of the clamping system 125 including a plurality of multi-axis coupling units 130 and a plurality of force applying units 140. The force applying units 140 include plungers (or force applying members) 142 that may apply clamping force to a work piece (not shown) as described with reference to FIGS. 1, 2A, and 2B, above. This chain 127, by way of example and not limitation, is suitably an alternating chain of multi-axis coupling units 130 and force applying units 140.

In FIG. 5A, the chain 127 is shown isometrically with the chain 127 aligned generally along an x-axis. As further shown in this figure, the y-axis runs left to right and the z-axis runs up and down. The chain 27 including multi-axis coupling units 130 may be pivoted in several directions, such as rotation around the x-axis and bending in the xz plane. The chain 127 can thus apply a clamping force at points along the chain 127 in complex line that suitably weaves through 3-space and includes translations and rotations. In this example, the chain 127 includes force applying units 140 with some of the force applying units 140 aligned with their plungers 142 in the z-direction, while other of the force applying units 140 are rotated around the x-axis so their plungers 142 apply forces that may include a y-component and a z-component.

Figure 5B:
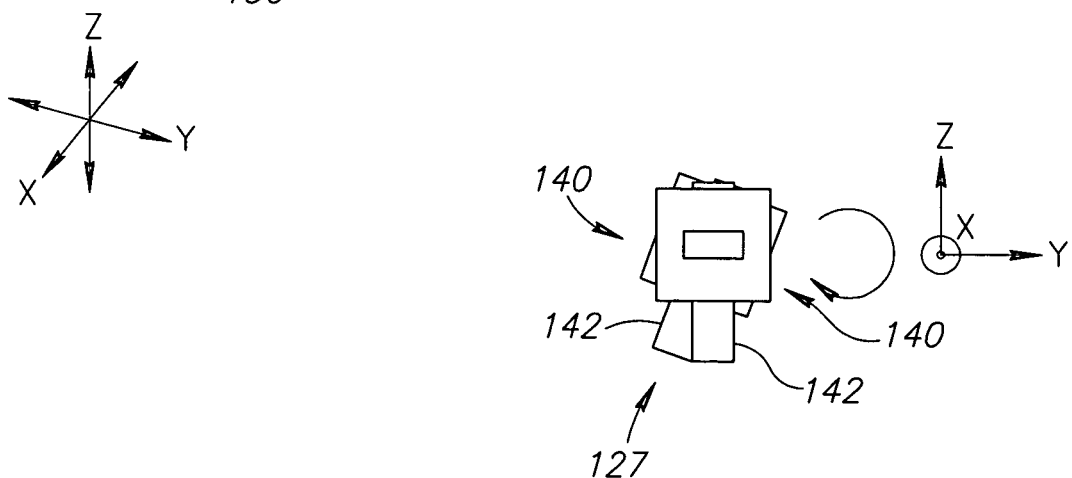
FIG. 5B is an end view of the exemplary multi-axis clamping system of FIG. 5A.

FIG. 5B is an end view of a segment of the chain 127 of FIG. 5A, as viewed along the x-axis. Two force applying units 140 are shown, one with its plunger 142 aligned in the z direction, and a second force applying unit 140 behind the first one with its plunger 142 angled to apply a force approximately 45 degrees off of the z-axis. Thus, force may be applied diagonally by rotation of the force applying unit 140 around the x-axis relative to the other force applying unit 140 in the chain 127.

Figure 6A:
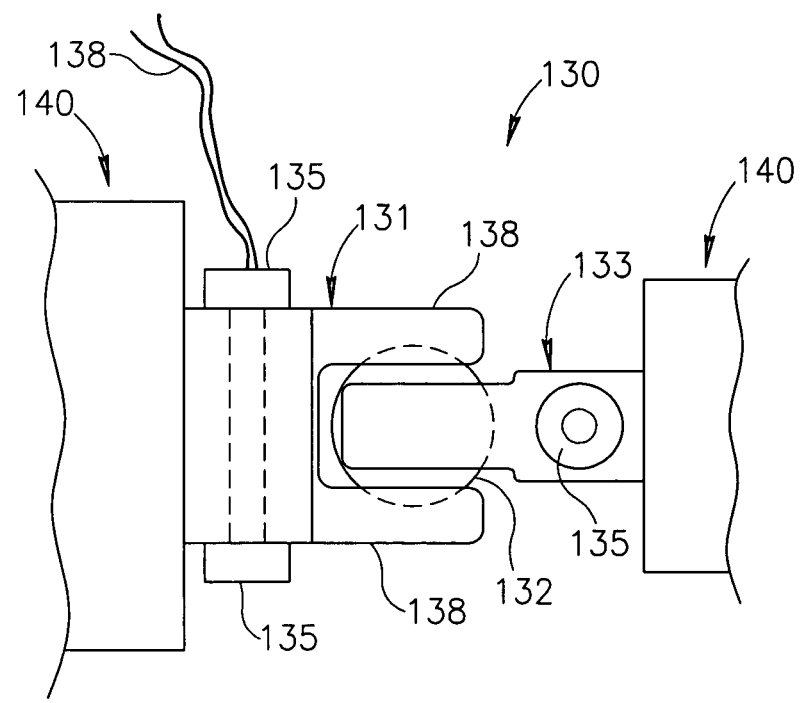
FIG. 6A is a top view of an exemplary multi-axis coupling unit of the multi-axis clamping system of FIG. 5A in accordance with an embodiment of the present invention.

FIG. 6A shows an exemplary multi-axis coupling unit 130 of FIG. 5A in accordance with another embodiment of the invention. The coupling unit 130 is attached to two force applying units 140 (each only partially shown). The coupling unit 130 includes a first arm 131 and a second arm 133 that are linked to a ball pivot 132. The ball pivot 132, by way of example and not limitation, includes a knurled ball which is gripped by the first arm 131 and gripped separately by the second arm 133. This permits the arms 131 and 133 to pivot and rotate with respect to one another, and then to lock in place when they are locked firmly against the knurled ball forming the pivot ball 132. Teeth or contours (not shown) in the first arm 131 and in the second arm 133 may grip the pivot ball 132 when the coupling unit 130 is locked, and may at least partially release it when the coupling unit 130 is released. When the coupling unit is released, the first arm 131 and the second arm 133 may bend and pivot with respect to one another.

In this example, the first arm 131 and the second arm 133 are assembled in two parts that grip opposite sides of the ball pivot 132. The first arm 131 and the second arm 133 each include two pincers 138 that grasp the pivot ball 132 like two offset pairs of tweezers used to simultaneously grasp a ball bearing from different directions. In this example embodiment the pincers 138 of the first arm 131 and the second arm 133 are locked against the pivot ball 132 by a locking mechanisms 135 that alternately lock and unlock, permitting pivoting and rotation of the arms 131 and 133 around the pivot ball 132. As a result, adjoining force applying units 140 attached to the coupling unit may be pivoted or rotated with respect to each other on a multitude of axes.

The locking mechanisms 135 in this example embodiment suitably include one or more electric solenoids that hold the pincers 138 together against the pivot ball 132 when activated, and release the knurled ball 132 from the pincers 138 when disengaged. The locking unit 135 is suitably driven from an external power source through a wiring harness 138 to a controller (not shown). It will be appreciated that in this embodiment the locking unit 135 applies a locking force to the pincers 138 in much the same manner as one's thumb and forefingers apply force to a pair of tweezers holding the tweezer pincers closed around an object.

Figure 6B:
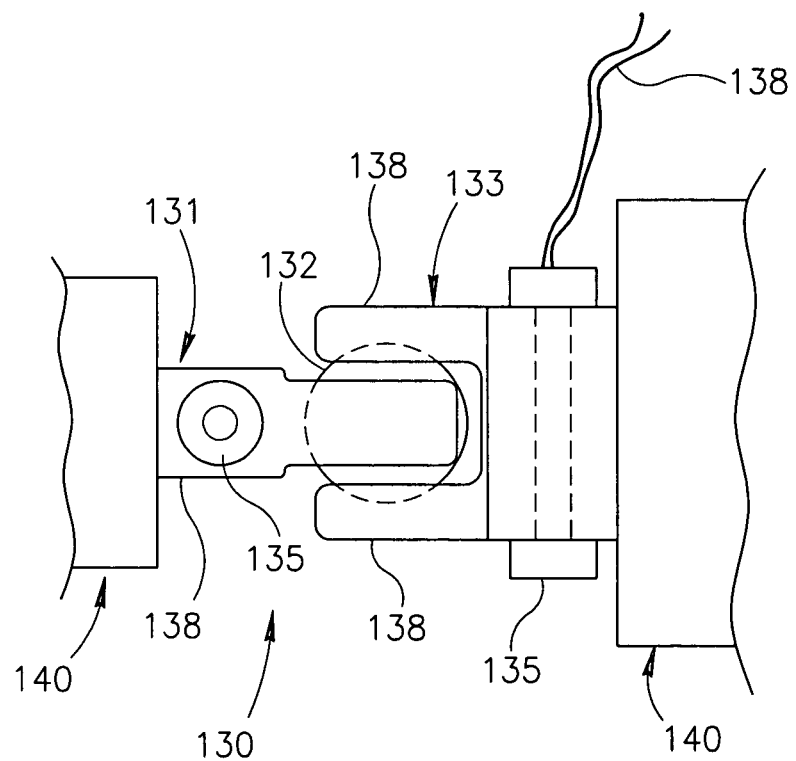
FIG. 6B is a side view of the exemplary multi-axis coupling unit of FIG. 6A.

FIG. 6B is a side view of the multi-axis coupling unit 130 of FIG. 6A and FIGS. 5A and 5B. In this example embodiment, the first arm 131 and the second arm 133 of the coupling unit 130 on alternate sides of the pivot ball 132 are symmetrical. Thus, this FIG. 6B appears as a rotation of FIG. 6A. In FIG. 6B, pincers 138 of the second arm 133 grasp the top and bottom of the pivot ball 132. The pincers 138 of the first arm 131 grasp the pivot ball 132 towards the viewer and away from the viewer (not shown) in this side view without overlapping the pincers 138 of the second arm 133.

Figure 7:
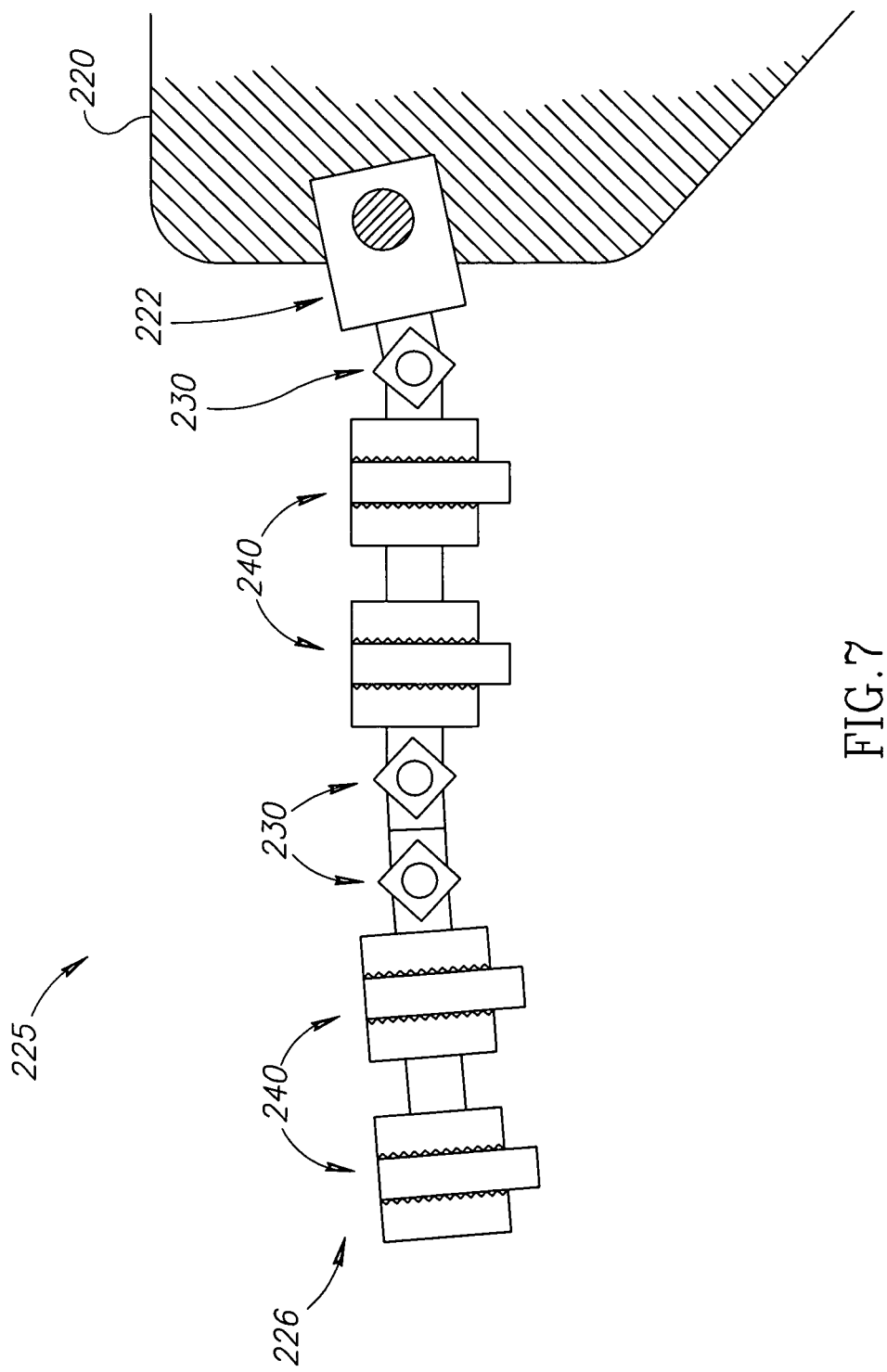
FIG. 7 is a side view of an exemplary cantilevered clamping system in accordance with another alternate embodiment of the present invention.

It will be appreciated that clamping systems in accordance with the present invention can be configured in a variety of ways. An alternate embodiment of a clamping system 225 of the present invention is shown in FIG. 7 cantilevered from a single fixed support 220. It will be appreciated that depending upon the clamping force appropriate for the manufacturing operation requiring clamping, a chain of the present invention such as the chain 226 in FIG. 7 suitably may be anchored only on one end. This chain 226 includes an end unit 222 rigidly attached to a fixed anchor 220. The chain 226 is suitably cantilevered from that end unit 222 when the coupling units 230 of the chain 226 are locked. In this exemplary chain, the sequence of units is as follows: end unit 222/coupling unit 230/force applying unit 240/force applying unit 240/coupling unit 230/coupling unit 230/force applying unit 240/force applying unit 240. It will be appreciated that a chain of the present invention, such as the chain 226 shown in FIG. 7, suitably may have force applying units 240 next to force applying units 240, and coupling units 230 next to coupling units 230, in lieu of or with alternating coupling units 230 and force applying units 240. The clamping system 225 suitably may apply clamping force to a work piece (not shown) by the work piece being brought next to the chain 226 or vice versa. As described above, the coupling units 230 may be relaxed to conform the chain 226 to the contours of the work piece (not shown). The coupling units 230 may then be locked, and the force applying units 240 activated to apply clamping force to the work piece.

Figure 8:
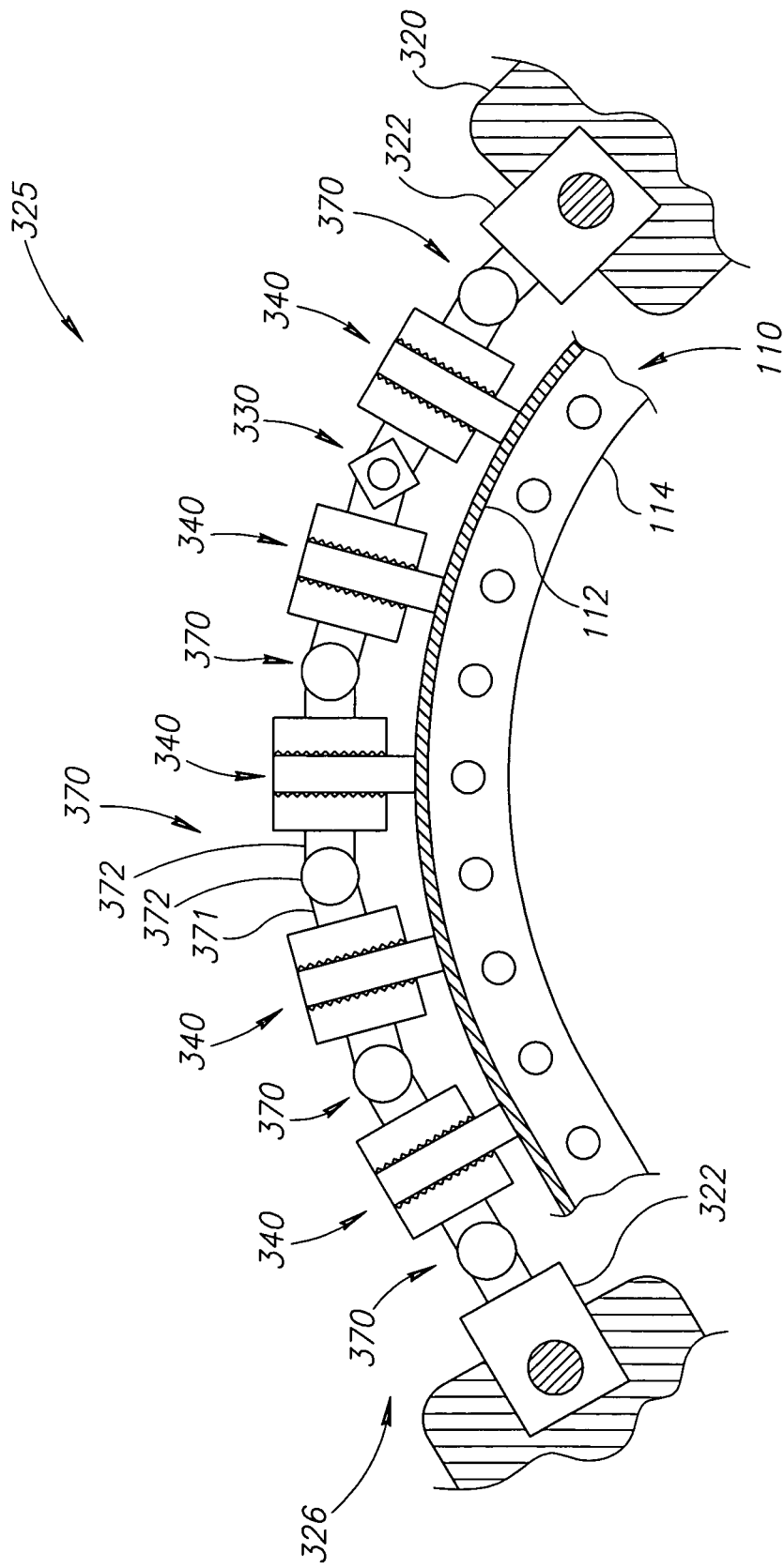
FIG. 8 is a side view of an exemplary non-locking clamping system engaged with a work piece in accordance with a further alternate embodiment of the present invention.

FIG. 8 shows a clamping system 325 in accordance with a further embodiment of the present invention. The clamping system 325 includes a chain 326 of force applying units 340, a locking coupling unit 330, and non-locking pivots 370. The chain 326 of this clamping system 325 is attached at the two ends of the chain 326 through end units 322 to secure supports 320. It will be appreciated that, when the chain 326 is draped over a convex shaped work piece 110 such as shown in FIG. 8 and maintained in tension, non-locking pivots 370 suitably may be utilized with force applying units 340 to apply clamping force to the work piece 10. It will also be appreciated that a chain suitably may apply clamping force to a work piece with a mix of concave and convex surfaces without all coupling units being locked or lockable if the chain is held in tension over the work piece and the coupling units of the chain over concave surfaces are locked. Thus, by way of example and not limitation, the chain 326 of FIG. 8 includes a mixture of locking coupling units 330 and non-locking pivots 370 interspersed with force applying units 340. The chain 326 of FIG. 8 from end to end includes the following units: end unit 322/pivot 370/force applying unit 340/locking coupling unit 330/force applying unit 340/pivot 370/force applying unit 340/pivot 370/locking unit 340/pivot 370/locking unit 340/pivot 370/end unit 322.

The pivot units 370 suitably include a first arm 371 and a second arm 373 with a non-locking pivot 372 between the two. These units thus freely pivot as the chain 326 is draped over a work piece 110 and held in tension when the force applying units are activated applying clamping force to the work piece. Thus, the chain 326 with a mixture of locking coupling units 330 and non-locking pivots 370 can suitably hold a skin 110 against the underlying frame 114 on a work piece 110 during a manufacturing operation without all of the coupling units 330 or pivots 370 locking.

Figure 9:
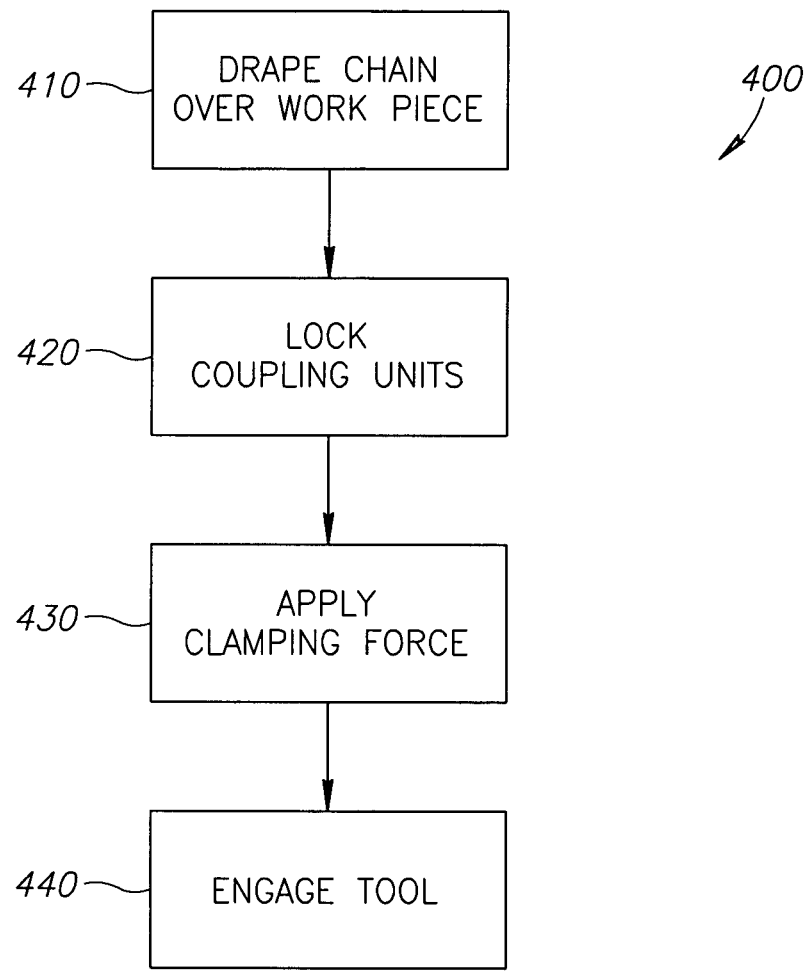
FIG. 9 is a flow chart of an exemplary method of clamping in accordance with another embodiment of the present invention.

FIG. 9 is a flow chart of an exemplary method of clamping 400 in accordance with yet another embodiment of the present invention. At a block 410, the chain of a clamping system of the present invention may be draped or otherwise positioned proximate a work piece such that at least some of the force applying units of the chain are engageable with the work piece. Next, at a block 420, the coupling units of the chain are locked. It will appreciated that step 420 may be omitted as to some or all the coupling units, depending upon the shape and configuration of the work piece, if the chain is held in tension over the work piece, as described above with reference to FIG. 8. Next, at a block 430, the force applying units may be activated such that a clamping force is applied to the work piece. Then at a block 440, the manufacturing tool may be engaged with the work piece to perform a manufacturing operation.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

what is claimed is:

1. A system comprising:
   a crib;
   an aircraft frame supported by the crib;
   aircraft skin having a complex surface shape, the aircraft skin pressed against the aircraft frame; and
   a chain of interspersed coupling units and force-applying units, the chain stretching across the surface of the skin, the coupling units allowing the force-applying units to conform to the complex shape of the skin, the force-applying units pressing the aircraft skin against the frame.

2. The system of claim 1, wherein at least one of the coupling units includes a single pivot, and a first arm and a second arm linked by the single pivot.

3. The system of claim 2, wherein the lockable pivot and the first and second arms function as a bendable elbow.

4. The system of claim 3, wherein the first and second arms include interlocking teeth, arranged to interlock when

* * * * *